(12) United States Patent
Shimura

(10) Patent No.: US 8,010,839 B2
(45) Date of Patent: Aug. 30, 2011

(54) TEST SYSTEM AND METHOD WHICH CAN USE TOOL DURING DEBUGGING

(75) Inventor: Takumi Shimura, Tokyo (JP)

(73) Assignee: Advantest Corporation, Tokyo (JP)

( * ) Notice: Subject to any disclaimer, the term of this patent is extended or adjusted under 35 U.S.C. 154(b) by 253 days.

(21) Appl. No.: 12/370,275

(22) Filed: Feb. 12, 2009

(65) Prior Publication Data

US 2009/0204849 A1 Aug. 13, 2009

(30) Foreign Application Priority Data

Feb. 12, 2008 (JP) ................................. 2008-030180

(51) Int. Cl.
*G06F 11/00* (2006.01)
(52) U.S. Cl. .......................................................... 714/25
(58) Field of Classification Search .............. 714/25–32, 714/34–38, 39, 42, 48–51
See application file for complete search history.

(56) References Cited

U.S. PATENT DOCUMENTS

| | | | |
|---|---|---|---|
| 6,718,484 B1* | 4/2004 | Kodera | 714/35 |
| 6,895,578 B1* | 5/2005 | Kolawa et al. | 717/130 |
| 2004/0216102 A1* | 10/2004 | Floyd | 718/100 |
| 2004/0255296 A1* | 12/2004 | Schmidt et al. | 718/100 |
| 2007/0028240 A1* | 2/2007 | Hayakawa | 718/100 |
| 2007/0168968 A1* | 7/2007 | Bates et al. | 717/124 |
| 2007/0226740 A1* | 9/2007 | Li et al. | 718/102 |
| 2007/0288907 A1* | 12/2007 | Olivier et al. | 717/129 |

OTHER PUBLICATIONS

Semiconductor Test Consortium (online) searched on Feb. 12, 2008, http://www.semitest.org/jp/home, 1 page.

* cited by examiner

*Primary Examiner* — Nadeem Iqbal
(74) *Attorney, Agent, or Firm* — Osha•Liang LLP

(57) ABSTRACT

A test process executed by a test system includes a test class thread for executing a test class in which a procedure for testing a device is described, and a tool thread for executing a tool which includes a function that can be used for the test of the device. Then, during debugging of the test class, the test system controls the test class thread so that the test class thread is in a stopped state, and controls the tool thread so that the tool thread is in an operating state.

7 Claims, 5 Drawing Sheets

TEST SYSTEM AND METHOD WHICH CAN USE TOOL DURING DEBUGGING

BACKGROUND

1. Technical Field

The present invention relates to the field of automatic test equipment, and particularly to a debugging support technology of a test program incorporated in automatic test equipment.

2. Related Art

Conventionally, since automatic test equipment (hereinafter referred to as "ATE") is provided in accordance with specifications of respective ATE manufacturers, it has low flexibility in configurations such as of a pin and a measuring device, and is difficult to reuse test program resources. Because of this background, open architecture ATE has a standardized interface has been proposed to realize scalable and flexible ATE which can modify a system such that it has the optimal configuration depending on a device's function.

For example, OPENSTAR (R) is one of open architecture ATE standards (see Semiconductor Test Consortium (online), searched in Feb. 12, 2008, http://www.semitest.org/jp/home). T2000 test system is a test system which employs an open architecture of OPENSTAR standard.

In the T2000 test system, an algorithm for a device test is described as a class of C++ language (hereinafter referred to as "test class"). Generally, a software development environment such as Microsoft Visual Studio (R) is used for creation of a test class, and Microsoft Visual Studio debugger (VS Debugger) is used for debugging of a test class at language level.

A debugger has a "breakpoint" function for interrupting execution of a program at a specified position. Using this function, a user can stop execution of a program written by oneself at any position (breakpoint), and debug the program finely line by line. However, there is a problem that conventional ATE cannot use a tool during debugging of a test class. A tool as used herein refers to a variety of processing functions (API) used for operations about device tests, and includes, for example, a tool for inputting a predetermined waveform to a device, and a tool for analyzing an output from a device.

FIG. 7 is a diagram schematically showing processing for debugging a test class in conventional ATE, and used for illustrating the above described problem Test class 330 created by a user operates in test process 320, and debugger 340 is used for debugging code of test class 330. In the illustration of FIG. 7, breakpoint 342 is set by a user in the part of "DUTID_t dutID=1;" in source code 341 of a test class attached to debugger 340.

In the conventional ATE, when test class 330 is debugged by debugger 340, processing is interrupted at a line at which breakpoint 342 is set, and transition is made to a break state. At this time, debugger 340 stops all the processing being executed on the ATE. If a plurality of threads are in a process, the conventional debugger stops all the threads in the break state.

In the break state, tool 310 cannot be used because handling of all requests is also stopped. If tool 310 is to be used, the stop (break) of the process by debugger 340 needs to be cancelled. For using the tool, it is also assumed that the stop is cancelled for a short time in which the tool is used, and the state is then immediately returned to the stopped state. However, in this case, during this short time, execution of the test class is performed, and the position in which the code is to be executed by the user also proceeds. Therefore, debugging of the user code in the target position cannot be continued.

Some debuggers have a suspend function. In a case where a test class is divided into a plurality of test units, this suspend function suspends (pauses) processing between a test of one test unit and a test of the next test unit, so that the tool can be used during the suspension. Although the tool can be used between predetermined test units, the suspend function does not allow the tool to be used at an arbitrary point of a test class.

Originally, the debugger and the tool are both intended to collect information about operation of a test class. Therefore, if the tool can be used during debugging of a test class by using the debugger and tool at the same time, this provides great benefit to users.

The present invention has been made in view of the above circumstances, and an object of the present invention is to provide a test system having a debugging support function which allows a tool to be used in a state in which execution of a test class is being stopped when the test class is debugged by a debugger.

A further object of the present invention is to provide a test system which can automatically make a state transition between a state in which a test class can be debugged and a state in which a tool can be used according to operation of a user.

SUMMARY

To solve the above described problems, one of aspects of the test system according to the present invention is a test system which can execute a test process for performing a test of a device, the test process including a plurality of threads. One of the plurality of threads is a first thread for executing a program in which a procedure for testing the device is described. Then, the test system can control the first thread so that only the first thread is in a stopped state during debugging of the program.

Further, one of the aspects of the test system according to the present invention is a test system which is configured to execute a test process for performing a test of a device, the test process including a test class thread for executing a test class in which a procedure for testing the device is described; and a tool thread for executing a tool which includes a function that can be used for the test of the device. Then, during debugging of the test class, the test system is configured to control the test class thread so that the test class thread is in a stopped state, and control the tool thread so that the tool thread is in an operating state.

Further, one of the aspects of the test system according to the present invention is a test system which is configured to execute a test process for performing a test of a device, the test process including a test class thread for executing a test class in which a procedure for testing the device is described; and a tool thread for executing a tool which includes a function that can be used for the test of the device. This test system includes, as states during debugging of the test class, a normal execution state in which both the test class thread and the tool thread are made to operate, a debugging state in which both the test class thread and the tool thread are stopped, and a tool enabled state in which the test class thread is stopped and the tool thread is made to operate.

Preferably, the test system performs switching between the debugging state and the tool enabled state according to operation of a user. Further, the test system preferably performs switching to the debugging state when a window for debugging is active, and performs switching to the tool enabled state when a window for operating the tool is active.

One of aspects of the method for enabling a tool to be used according to the present invention is a method for enabling a tool to be used during debugging of a test class in which a procedure for testing a device is described in a test system which is configured to execute a test process for performing a test of the device, the method including the steps of stopping all of threads included in the test process; and causing a thread for executing the tool to operate while stopping and freezing a thread for executing the test class, wherein the tool includes a function that can be used for the test of the device.

One of aspects of a program according to the present invention causes a computer to execute the process steps of the method which enables a tool to be used according to the present invention. One of aspects of the program of the present invention can be installed or loaded into a computer by being downloaded through various recording media such as an optical disk (e.g. CD-ROM), a magnetic disk, and a semiconductor memory or through a communication network or the like.

As used herein, "means" or "section" refers not only to a physical means but also to means or a section which is realized as a function of the means or section by software. A function included in one means or section may be realized by more than one physical means, and functions of more than one means or section may be implemented by one physical means.

A "thread" as used herein refers to a unit to execute a program in a process. A plurality of threads is configured to exist in one process. A thread belonging to the same process shares resources such as a memory.

As used herein, hardware of a measurement instrument supplied by a vendor or the like is referred to as a "module", and software specific for such hardware which is supplied by a vendor or the like is referred to as "module software".

According to one aspect of the present invention, when a test class is debugged by a debugger, a tool can be used in a state in which execution of the test class is being stopped. Thereby, a user can debug the test class more efficiently.

Further, according to one aspect of the present invention, a state transition between a state in which debugging is allowed and a state in which a tool is enabled to be used can be automatically made according to operation of a user. Thereby, the user can easily use the tool without being aware of a state and an operation of a thread during debugging.

BRIEF DESCRIPTION OF THE DRAWINGS

FIG. 5 is a diagram showing a structure of test process 20 operating on site controller 104 or the like;

DESCRIPTION OF EXEMPLARY EMBODIMENTS

Figure 1:
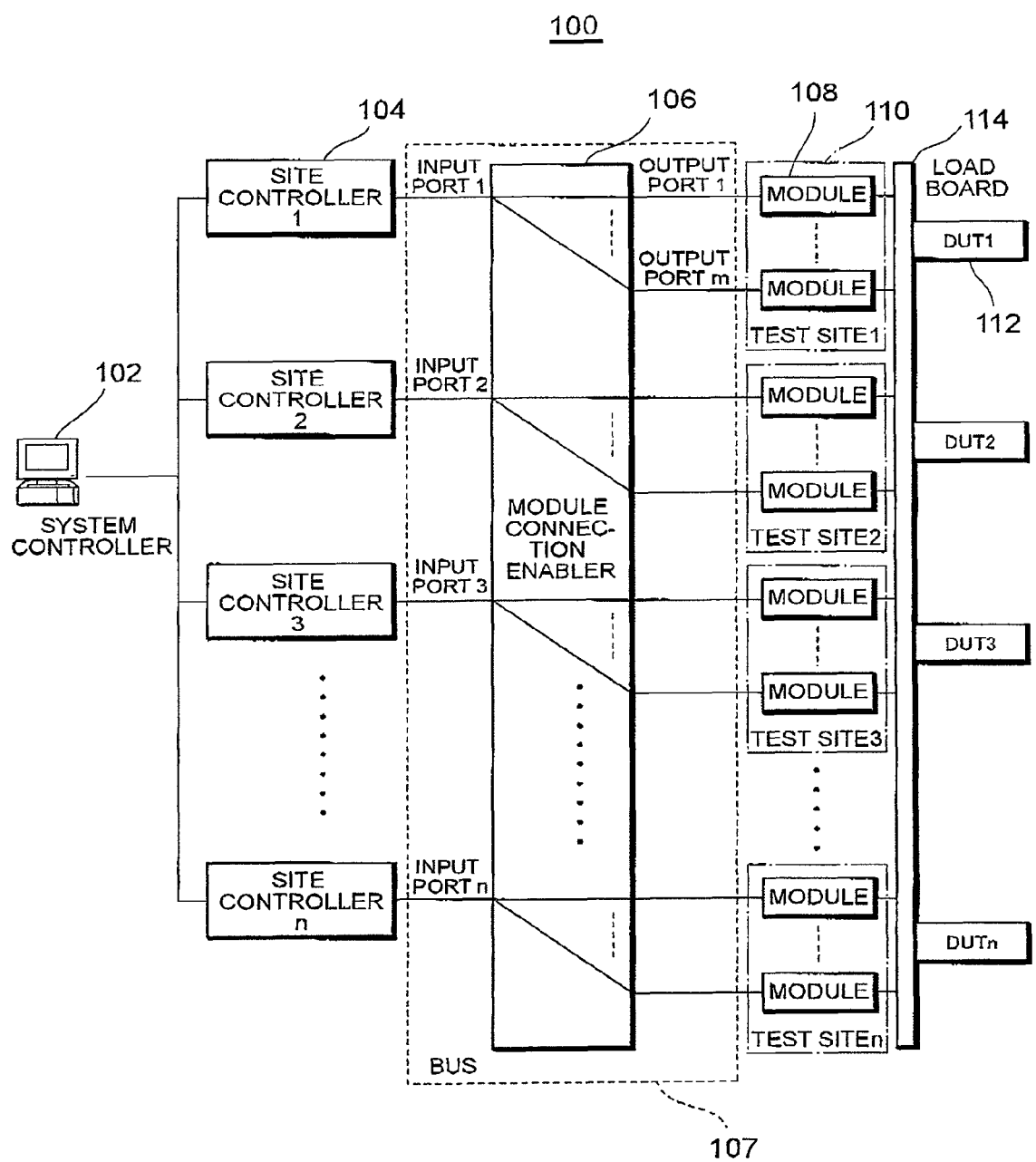
FIG. 1 is a diagram showing a system architecture of test system 100 according to one embodiment of the present invention.

Hereinafter, an embodiment of the present invention will be described in detail. Like reference numerals refer to like parts, and their repeated description will be omitted. The embodiment described below are just examples to describe the present invention, and are not intended to limit the present invention. The present invention may be modified and applied in various ways without departing from the gist of the present invention.

FIG. 1 shows a system architecture of test system 100 according to one embodiment of the present invention. Test system 100 generates a test signal and supplies the test signal to Device under Test (hereinafter referred to as "DUT") 112, and determines whether DUT 112 is acceptable or not based on whether or not an expected value matches a resulting signal which is outputted as a result of operation of DUT 112 based on the test signal. Although test system 100 according to the present embodiment will be described as a test system implemented by an open architecture, the present invention is not limited thereto.

In the present embodiment, system controller (SysC) 102 is connected to a plurality of site controllers (SiteC) 104 via a network. System controller 102 is a host computer by which an end user performs normal operation, and serves to manage the whole test system 100. In addition, system controller 102 performs issue of a request for processing to site controllers 104 and mediation of processing between site controllers 104. A user's application and a standard GUI tool operate on system control 102 and communicate with site controller 104, thereby implementing their function.

Further, system controller 102 includes module software which controls module 108 on site controller 104, and a storage which stores a user's test program and a pattern program. These are sent to site controller 104 and executed as necessary.

Each site controller 104 is connected through module connection enabler 106 to one or more modules 108 provided in test site 110, so as to control them to perform a test. This test is performed based on a test program created by a user. Site controller 104 may simultaneously control a plurality of test sites 110 through which one DUT 112 is tested.

Three main roles of site controller 104 are as follows. First, site controller 104 configures module connection enabler 106 according to a configuration of test site 110 specified by a test program, and thereby establishes a connection of bus 107 between site controller 104 and module 108. Secondly, it executes module software which controls module 108 in test site 110. Further, it executes the test program to perform a test of DUT 112 of respective test site 110.

In some operating environments, system controller 102 may be located on a CPU (Central Processing Unit) different from the CPU for operation of site controller 104. Alternatively, system controller 102 and site controller 104 may share a common CPU. Alternatively, each site controller 104 may be located on its dedicated CPU, or may be provided as an independent process or thread in the same CPU.

Module connection enabler 106 is a switch which can configure a connection of bus 107 between site controller 104 and module 108 in any manner. Module connection enabler 106 enables a configuration of hardware module 108 connecting therewith to be changed, and acts also as a bus for data transfer (for loading pattern data, collecting response data, control, etc.). Possible implementations of the hardware include dedicated connection, switched connection, bus connection, ring connection, and star connection. Module connection enabler 106 may be implemented as, for example, a switch matrix.

Module 108 is hardware of a measurement instrument which supplies a test signal to DUT 112. In the present embodiment, various types of modules based on open architecture may be used as module 108. Software for operating module hardware 108 is called module software. The module software includes a module driver which performs control of module 108 during measurement of a device, calibration and diagnosis software which performs calibration and diagnosis of module 108, emulation software which emulates operation of module 108, a pattern compiler specific to module 108, a GUI tool, and the like.

Each test site 110 is associated with one DUT 112 DUT 112 is connected to module 108 in corresponding test site 110 through load board 114.

Figure 2:
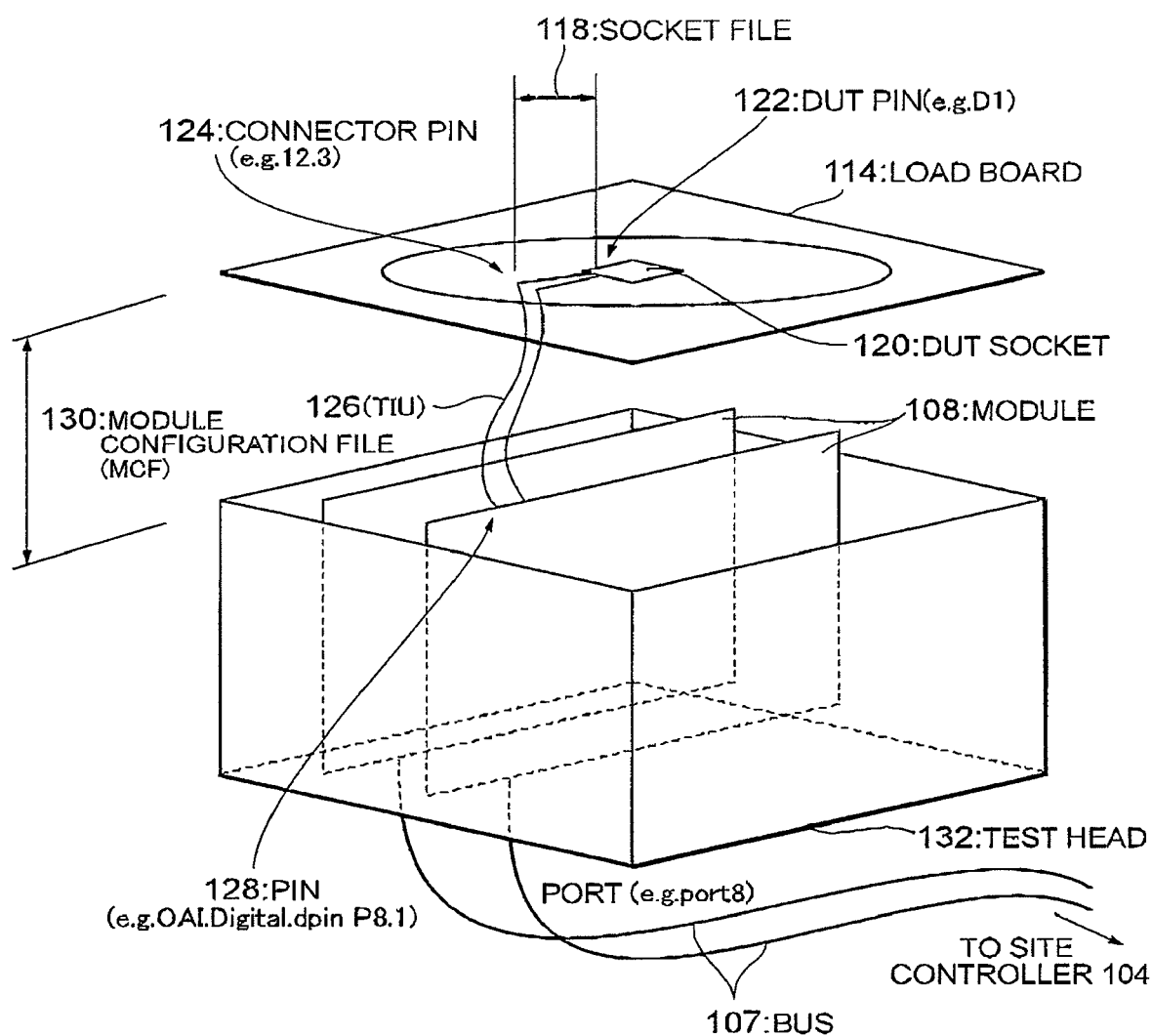
FIG. 2 is a diagram showing one example of a schematic configuration of hardware of test site 110 and load board 114 and a relationship between various configuration files and the hardware.

FIG. 2 is a diagram showing one example of a schematic configuration of hardware of test site 110 and load board 114 and a relationship between various configuration files and the hardware. As shown in FIG. 2, module 108 is inserted into a module slot in test head 132 of test system 100.

A configuration of test site 110 is specified by socket file 118 which is described in text format. In this socket file 118, a connection between DUT pin 122 of DUT socket 120 and connector pin 124 on load board 114 is described for each DUT 112. Connector pin 124 is assigned a block number and a connector number, which are represented in a format of "(block number), (connector number)", for example, represented as "12.3". Connector pin 124 of load board 114 is connected to pin 128 of module 108 through tester interface unit (hereinafter referred to as "TIU") 126.

Load board 114 is often different depending on a device to be tested. Therefore, for preventing module software from depending on specific implementations of load board 114, it is required that pin 128 itself provided in module 108 can be defined and module 108 can be controlled based on this definition in test system 100. This is achieved in test system 100 by module configuration file (hereinafter referred to as "MCF") 130.

In MCF 130, a connection relationship between a resource of module 108 and connector pin 124 of load board 114 is specified, thereby defining a relationship between the resource which is a representation of a logical pin, and physical pin 128 of module 108 and thus connector pin 124 of load board 114 connected to physical pin 128. Preferably, MCF 130 is set only by the system.

In the present embodiment, a function of module 108 is represented by a module object which mainly provides a function about overall control of module 108, and a resource object which provides a function of each pin of the module. In test system 100 of the present embodiment, all these objects are symmetrically associated with entities of actual hardware according to description of MCF 130. As used herein, module software which provides such a software object is referred to as a module driver.

In the present embodiment, a resource is an object in which physical pin 128 provided to module 108 of test system 100 and its function are abstracted and represented. One physical pin 128 of module 108 may be represented as one resource or a plurality of functionally divided resources.

Function classifications of resources are called resource type, and a classified function is defined in a resource definition file provided by a vendor of module 108. A resource indicating a logical pin is represented by a set of three elements, a resource type, a number which identifies pin 128 in module 108 (resource ID), and a port number of bus 107 which identifies module 108 in test system 100. Since a relationship between a set of resource type and resource ID, and physical pin 128 in module 108 corresponding to the set, is fixed, if a resource is given, the resource can be associated with physical pin 128. However, the architecture does not necessarily require that a resource is associated with physical pin 128, and a function of module 108 may be represented as a virtual pin so that it can be controlled.

Figure 3:
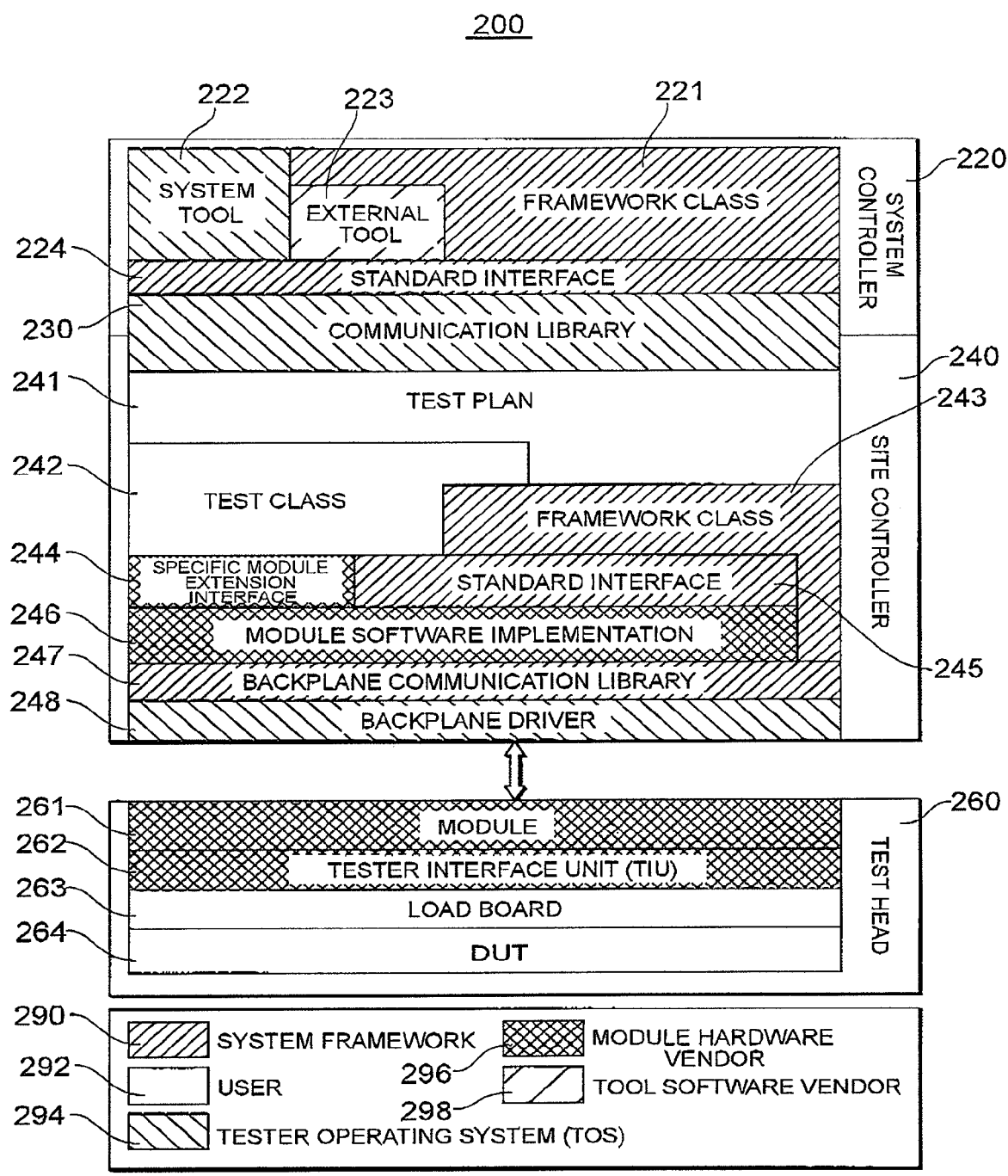
FIG. 3 is a diagram showing one example of software architecture 200 of test system 100.

FIG. 3 shows one example of software architecture 200 of test system 100. Software architecture 200 represents a distributed operating system, and has components for system controller software 220 (hereinafter also referred to simply as "system controller 220"), at least one site controller software 240 (hereinafter also referred to simply as "site controller 240"), and test head software 260 including at least one module (hereinafter also referred to simply as "test head 260"). System controller 220, site controller 240, and test head 260 correspond to their associated hardware system elements 102, 104, 108, respectively.

In one example, test system 100 can use Microsoft Windows (R) as a software platform, and use ANSI/ISO standard C++ as an implementation language. Also, every system interface of the platform can be provided as a class or interface of C++, and a user's test program and module software can be implemented by C++.

System controller 220 is a primary interaction point for a user, and provides a gateway to site controller 240 and synchronization of site controller 240 in a multisite/DUT environment. A user application and a tool are executed on system controller 220 whether or not they are based on a graphical user interface (GUI).

In addition, system controller 220 serves as a repository of all test plan related information including test plan, test pattern, and test parameter files. A memory for storing these files can be local to system controller 220 or can be connected to system controller 220 via a network.

System controller 220 includes framework class 221, system tool 222, external tool 223, standard interface 224 to the site controller, and communication library 230.

Framework class 221 associated with system controller 220 provides a mechanism for interacting with an object, and provides a reference implementation of standard interface 224. In addition, framework class 221 configures a software component which provides a gateway to site controller 240 and synchronization of site controller 240 in the multisite/DUT environment. Effectively, framework class 221 serves as an OS which supports system controller 220.

A third-party developer can provide one or more tool 223 in addition to or instead of standard system tool 222. Standard interface 224 on system controller 220 includes an interface used by such a tool to access a tester and a test object. The tester and the test object can be controlled interactively in a batch by tools (applications) 222, 223. Further, standard interface 224 includes an open interface to a framework object to be executed on system controller 220, an interface which allows module software based on site controller 240 to access and search pattern data, and the like.

Communication library 230 existing on system controller 220 provides a mechanism for communicating with site controller 240 in a manner transparent to a user application and a test program.

Site controller 240 is provided with the greater part of the test function. Site controller 240 includes test plan (test program) 241, test class 242, site controller framework class 243, specific module extension interface 244, standard interface 245, module software implementation 246, backplane communication library 247, and backplane driver 248.

Test plan 241 is described by a user. The test plan program can be directly described in a normal computer language using an object-oriented component such as of C++ or described in a higher level test programming language for generating C++ code, and then can be compiled in an executable test program.

Test plan 241 creates a test object using test class 242 (which is a standard test class or supplied by a user) and/or framework 243 associated with relevant site controller 240, configures hardware using standard interface 245, and thus defines a test plan flow. The test plan supports some basic services, and provides an interface to a service of a lower layer object such as a debugging service (e.g., creation of a breakpoint) so as to allow access to a framework and a standard class in a lower layer.

Test class 242 is one implementation of the standard test interface, and specified by the test plan program. Generally, each test class implements a certain type of device test or a setting for a device test.

Framework class 243 is a set of classes or methods which implements a common test-related operation. Framework class 243 can serve as a local OS which supports its respective site controller 240 in effect.

Preferably, module software is in DLL (Dynamic Link Library) format so that it can be dynamically loaded into a process of test system 100 as needed during execution of a test. This is because module 261 to be controlled is dynamically determined by test system 100 during the execution according to the configuration of test site 110 specified by test plan 241. All module software is required to implement standard interface 245 thereof defined by a system OS depending on a function of module 261.

Specific module extension interface 244, if needed, implements an interface hierarchy having a more complex and specialized function specific to a module by adding it to module software. For example, in C++, an interface class which inherits standard interface 245 can be defined by module software so as to extend the interface.

Standard interface 245 is an interface which is minimally required, universally applicable general interface that is defined by a system framework. All objects are handled in a uniform manner using standard interface 245. This allows software of a new module to be introduced into a system seamlessly in a plug-and-play manner without changing a system OS.

As one example, standard interface 245 is defined as a pure virtual interface class of C++. This class is preferably composed of a subclass which defines a function for a user, a subclass which defines a function that is used only by the system, and a subclass which defines a function of a resource. Standard interface 245 is preferably composed of four hierarchical levels; a hierarchical level in which a most basic function of a module is defined, a hierarchical level in which a module having a function of executing a pattern program is represented, a hierarchical level in which a concept of test cycle which is shared between a plurality of pins is introduced, and a hierarchical level in which a function specific to a digital module is added. Then, each module driver implements one of the four hierarchical level interfaces depending on a function of a module. However, standard interface 245 is not limited to the above described configuration.

Backplane communication library 247 provides an interface for normal communication over a backplane, thereby providing a function required for communication with module 108 in test head 260. Thereby, module software specific to a vendor can communicate with corresponding module 108 using backplane driver 248. A backplane communication protocol can use a format based on a packet.

Test head 260 is provided with a measurement function to measure a device. Test head 260 includes module 261, TIU 262, load board 263, and DUT 264.

On the basis of nominal suppliers of software, software architecture 200 can be classified into system framework 290, user component 292, tester operating system 294, module hardware vendor component 296, and tool software vendor component 298.

System framework 290 is supplied by a vendor who developed test system 100, and includes framework class 221, standard interface 224, framework class 243, standard interface 245, and backplane communication library 247.

User component 292 is supplied by a user who performs a test, and includes test plan 241, test class 242, load board 263, and DUT 264.

Tester operating system 294 is supplied as a software infrastructure for basic connectivity and communication, and includes system tool 222, communication library 230, and backplane driver 248.

Module hardware vendor component 296 is supplied by a developer of module 108, and includes specific module extension interface 244, module software implementation 246, module 261, and TIU 262.

Tool software vendor component 298 is supplied by an external tool developer, and includes external tool 223.

A test class debugging support function in test system 100 configured as described above will hereinafter be described.

Figure 4:
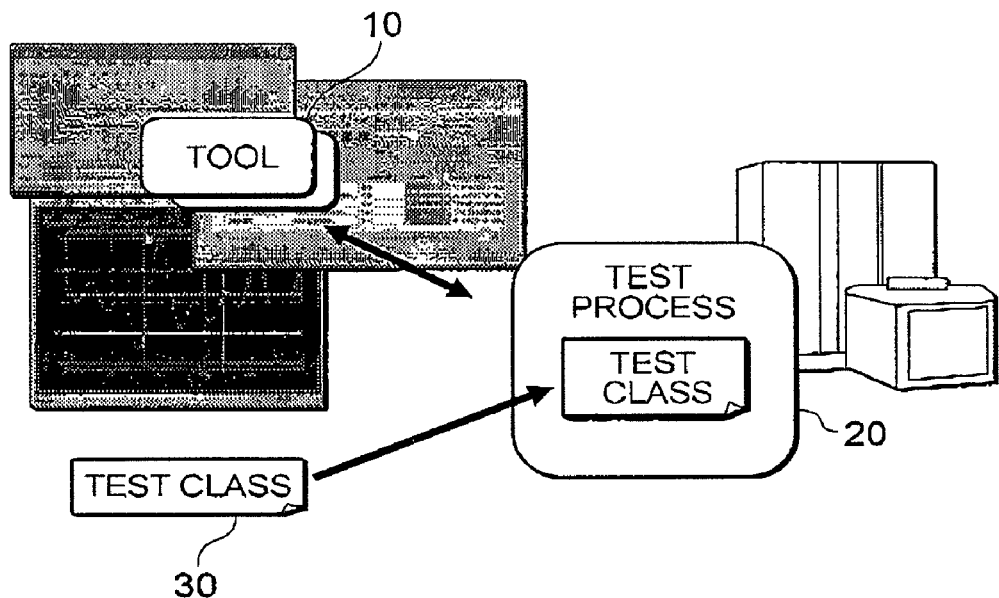
FIG. 4 is a block diagram showing a software configuration of test system 100 which is divided into three main components in terms of debugging processing.

FIG. 4 is a block diagram showing a software configuration of test system 100 which is divided into three main components in terms of debugging processing. As shown, the software configuration of test system 100 can be divided into tool (GUI tool) 10, test process 20, and test class 30.

Tool 10 is a function of various processing (API) which is used for operations about a test of device 112. A user controls test system 100 through tool 10. The user also can check a condition and a result of a device test on the GUI.

Test process 20 is the core process of the system software of test system 100, and operates on site controller 104. Test process 20 integrates the whole operation of the device test, and operates hardware such as module 108 for the device test.

Test class 30 is a test program created by a user of test system 100, in which a procedure, an algorithm, and the like of a device test are described as a class of a predetermined programming language such as C++. Test class 30 created by the user is loaded into the test process after being compiled, and operates in the test process.

Figure 5:
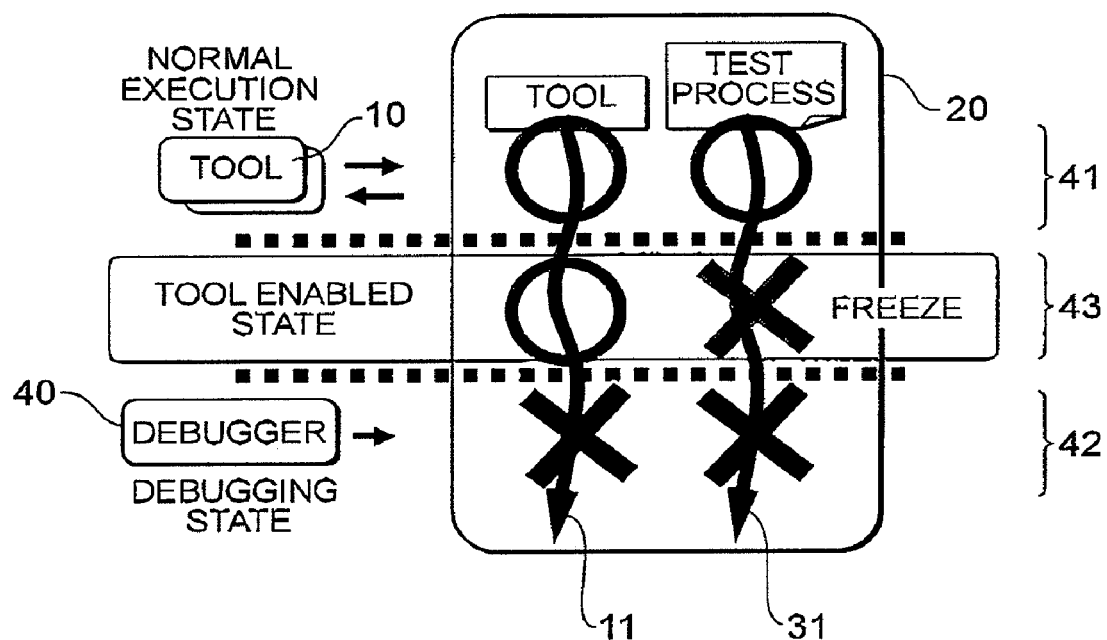

FIG. 5 is a diagram showing a structure of test process 20 operating on site controller 104 or the like. As shown in FIG. 5, test process 20 according to the present invention includes at least two threads 11, 31. One is thread 11 for processing by tool 10 (hereinafter referred to as "tool thread"), and the other is thread 31 for executing test class 30 (hereinafter referred to as "test class thread"). Thus, in this test process 20, execution of processing by tool 10 and execution of test class 30 are performed in separate threads 11, 31 respectively.

Further, in the present invention, operations of two threads 11, 31 are individually finely controlled so that test process 20 can operate in at least three states including normal execution state 41, debugging state 42, and tool enabled state 43.

Normal execution state 41 is a state in which both tool thread 11 and test class thread 31 are controlled to operate. In this state, since both threads 11, 31 operate, request processing of tool 10 and execution of test class 30 are both performed. In other words, this state corresponds to a normal process execution state of a conventional debugger.

Debugging state 42 is a state in which both tool thread 11 and test class thread 31 are controlled to be stopped. In this state, since both threads 11, 31 are stopped, request processing of tool 10 is not performed and execution of test class 30 is stopped. In other words, this state corresponds to a break state of the conventional debugger.

Tool enabled state 43 is a state unique to the present invention, in which only test class thread 31 is frozen in a stopped state, and tool thread 11 is controlled to operate. Thereby, tool 10 can be operated while execution of test class 30 is being stopped. In other words, tool enabled state 43 enables tool 10 to be used, while realizing a pseudo break state which superficially appears to be a break state.

In the present embodiment, a process stopping and resuming function and a freeze function which are provided by debugger 40 is used to achieve transition between the three states: normal execution state 41, debugging state 42, and tool enabled state 43. The process stopping and resuming function as used herein performs stop and resuming of operation of a process, that is, stop and resuming of operation of all the threads thereof. For example, the process stopping and resuming function includes a breakpoint function. The freeze function as used herein performs processing of temporarily freezing the state and operation of only a predetermined thread separately among a plurality of threads. When freeze is cancelled, the operation of the thread is resumed. In other words, the frozen thread has the same state and operation as before the freeze, and processing of the thread is stopped until the freeze is cancelled. A frozen state of the thread by the freeze function is prioritized over the process stopping and resuming function. Therefore, even if the process stopping and resuming function is used, a thread frozen in a stopped state by the freeze function is kept in the stopped state until the freeze is cancelled. The process stopping and resuming function is also different from the freeze function in that the process stopping and resuming function cannot control a state of each thread independently, although it can execute or stop states of all the threads.

First, in transition between normal execution state 41 and debugging state 42, transition is made to the break state (in which all threads are stopped) or the break state is cancelled. For example, at a break point that is set by a user, debugger 40 changes the state of test process 20 to the break state, thus making transition from normal execution state 41 to debugging state 42. When the user cancels the break state by the process resuming function, transition is made from debugging state 42 to normal execution state 41. Only in debugging state 42, the user can debug source code line by line using debugger 40. However, in debugging state 42, since all the threads are stopped and tool thread 11 is also stopped, tool 10 cannot be used.

For using tool 10 in a state in which execution of test class 30 is being stopped, it is required to make transition from debugging state 42 to tool enabled state 43. In the present embodiment, the freeze function provided by debugger 40 is used to realize tool enabled state 43, i.e., stop only at least test class thread 31 among a plurality of threads.

In the present embodiment, when transition is made from debugging state 42 to tool enabled state 43, debugger 40 freezes test class thread 31 in a stopped state by the freeze function, and then cancels the stopped state of test process 20 by the process resuming function. As a result, while threads other than frozen test class thread 31 are operating, the stopped state of the test class thread 31 is maintained because it has been frozen in the stopped state. In other words, instead of transition to normal execution state 41 without the use of the freeze function, transition to tool enabled state 43 is made because test class thread 31 has been frozen by the freeze function.

In tool enabled state 43, tool 10 can be executed while test class 30 is being stopped and a position of code being debugged by a user is retained.

When transition is made from tool enabled state 43 to debugging state 42, debugger 40 stops test process 20 by the process stopping function. At this time, operations of all threads other than test class 31 are stopped while the frozen state of test class 31 is maintained. After that, the freeze of test class thread 31 is cancelled. When the frozen state is thereby cancelled, test class thread 31 returns to the normal stopped state. All the threads including tool thread 11 and test class thread 31 are thus in the stopped state. As described above, tool enabled state 43 is changed back to debugging state 42, so that debugging of test class 30 by debugger 40 can be resumed while a position of code being debugged by a user is retained (i.e., execution of the test class is stopped).

Figure 6:
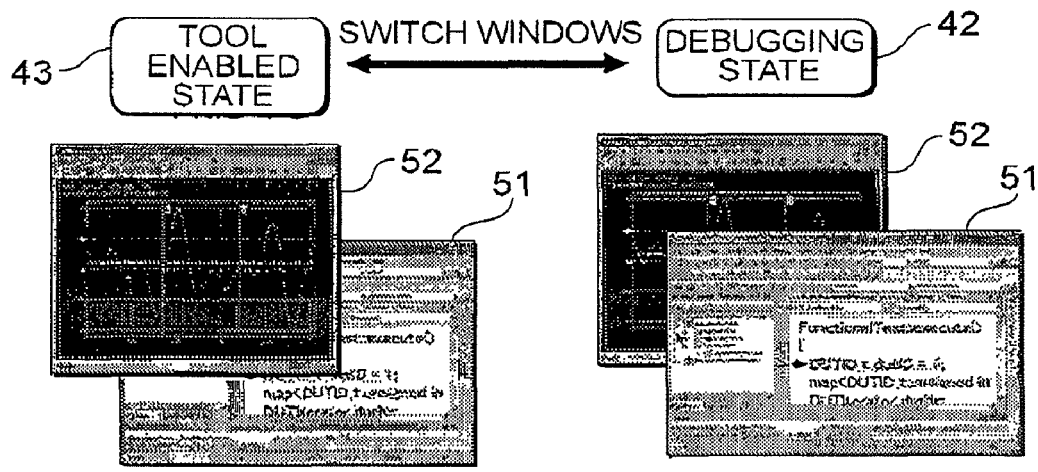
FIG. 6 is a diagram showing processing of automatically switching a state of debugging according to operation of a user.
Figure 7:
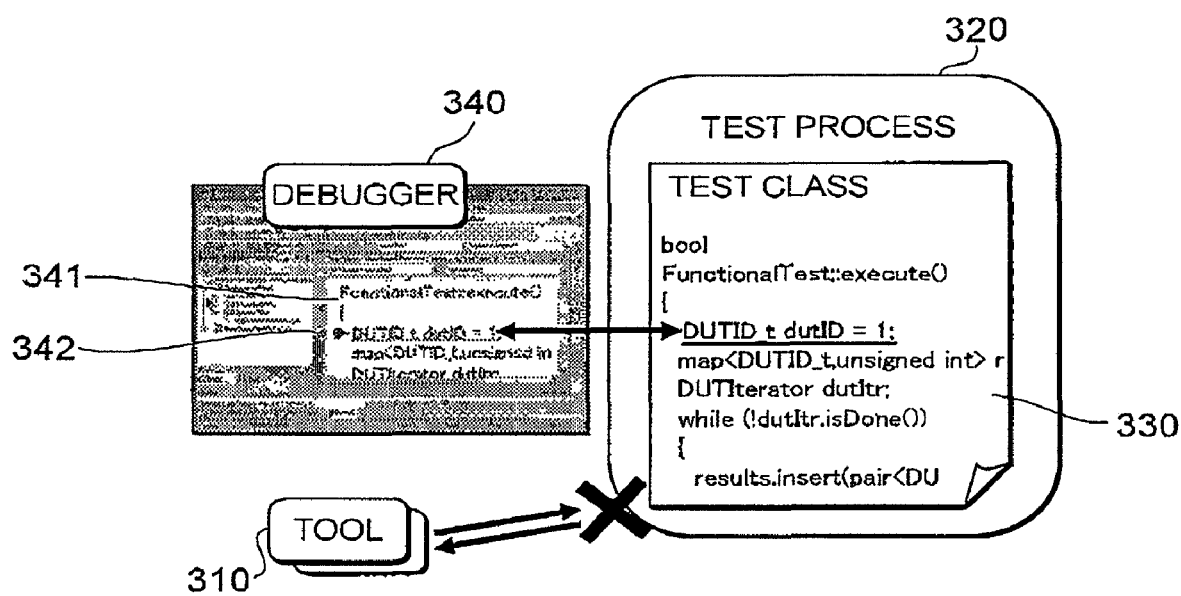
FIG. 7 is a diagram schematically showing processing for debugging a test class in conventional ATE.

FIG. 6 is a diagram showing processing of automatically switching a state of debugging according to operation of a user. In the present embodiment a test class created by a user is debugged using a debugger of system controller 102 or the like. In a display screen for debugging the test class, state transition is made between debugging state 42 and tool enabled state 43 according to movement of a focus between a window for debugger 40 (hereinafter referred to as "debugger window") 51 and a window for operating tool 10 (hereinafter referred to as "tool window") 52.

In the present embodiment, when debugger window 51 becomes active as shown in FIG. 6 due to control of system controller 102 or the like in which debugger 40 is executed, state transition is made to debugging state 42 so that debugger 40 can be used. When tool window 52 becomes active, state transition is made to tool enabled state 43 so that tool 10 can be used.

First, for example, when test process 20 is broken at a, breakpoint, transition is made from normal execution state 41 to debugging state 42. At this time, debugger window 51 becomes active due to control of system controller 102 or the like while test process 20 is put in a break state. Then, a user performs debugging processing as needed.

When the user makes tool window 52 active during debugging, state transition is automatically made from debugging state 42 to tool enabled state 43 so that the user can use tool 10 while execution of test class 30 is being stopped. Further, if the user makes debugger window 51 active after use of the tool or the like, state transition is automatically made from tool enabled state 43 to debugging state 42, and the process is put in a break state. In this state, the user cannot use tool 10, but can perform debugging processing on test class 30.

As described above, a state of process is automatically changed depending on a window (active window) on which a user focuses. Therefore, the user can perform operations for debugging test class 30 and using tool 10 during debugging in an intuitive manner without being aware of state transition during the debugging.

As described above, in the present invention, thread 11 for executing processing of tool 10 and thread 31 for executing test class 30 are formed in test process 20 as separate threads respectively. Then, a state of each thread is independently controlled so that three states: normal execution state 41, debugging state 42, and tool enabled state 43 are realized as execution states of test process 20. Particularly, in tool enabled state 43, only test class thread 31 is stopped, and tool thread 11 is made to operate. Thereby, tool 10 can be used during debugging of test class 30.

In addition, the debugging support function is provided which automatically makes state transition between debugging state 42 and tool enabled state 43. Thereby, a user can concentrate on debugging processing without being aware of the state of debugging.

Further, in the present invention, thread 11 for executing processing of tool 10 and thread 31 for executing test class 30 are formed as separate threads respectively, and controlled independently. Thereby, tool enabled state 43 is realized. Because of this, a test class created by a user is not required to be changed, and tool 10 itself is also not required to be changed. Therefore, in the present invention, past program resources and tools can be utilized without any special modification.

The present invention is not limited to the above described embodiment, and other various modifications may be made without departing from the gist of the present invention. The above described embodiment is only illustrative in all respects, and should not be construed as restrictive. For example, the above described process steps may be executed in any order or in parallel as long as the process is consistent.

This application is based upon and claims the benefit of priority from the prior Japanese Patent Application No. P2008-030180, filed on Feb. 12, 2008; the entire contents of which are incorporated herein by reference.

What is claimed is:

1. A test system which is configured to execute a test process for performing a test of a device, the test process comprising:
    a plurality of threads,
    wherein one of the plurality of threads is a first thread for executing a program in which a procedure for testing the device is described,
    wherein the test system is configured to control the first thread so that only the first thread is in a frozen state during debugging of the program, and
    wherein the frozen state of the first thread is prioritized over a process stopping and resuming function during debugging the program.

2. A test system which is configured to execute a test process for performing a test of a device, the test process comprising:
    a test class thread for executing a test class in which a procedure for testing the device is described; and
    a tool thread for executing a tool which includes a function that can be used for the test of the device,
    wherein during debugging of the test class, the test system is configured to control the test class thread so that the test class thread is in a stopped state, and control the tool thread so that the test thread is in an operating state.

3. A test system which is configured to execute a test process for performing a test of a device, the test process comprising:
    a test class thread for executing a test class in which a procedure for testing the device is described; and
    a tool thread for executing a tool which includes a function that can be used for the test of the device,
    wherein as a state during debugging of the test class, the test system includes a normal execution state in which both the test class thread and the tool thread are made to operate, a debugging state in which both the test class thread and the tool thread are stopped, and a tool enabled state in which the test class thread is stopped and the tool thread is made to operate.

4. The test system according to claim 3, wherein the test system performs switching between the debugging state and the tool enabled state according to operation of a user.

5. The test system according to claim 3, wherein the test system performs switching to the debugging state when a window for debugging is active, and performs switching to the tool enabled state when a window for operating the tool is active.

6. A method for enabling a tool to be used during debugging of a test class in which a procedure for testing a device is described in a test system which is configured to execute a test process for performing a test of the device, the method comprising:
    stopping all of threads included in the test process; and
    causing a thread for executing the tool to operate while stopping and freezing a thread for executing the test class, wherein the tool includes a function that can be used for the test of the device.

7. A computer readable storage medium on which a program for executing a computer to execute the method for enabling a tool to be used according to claim 6.

* * * * *